April 13, 1954 C. R. DOTY 2,675,231

CARD FEEDING DEVICE

Filed Nov. 21, 1950 2 Sheets-Sheet 1

INVENTOR
CHARLES R. DOTY
BY Charles P. Boberg
ATTORNEY

INVENTOR
CHARLES R. DOTY
BY Charles P. Boberg
ATTORNEY

Patented Apr. 13, 1954

2,675,231

UNITED STATES PATENT OFFICE 2,675,231

CARD FEEDING DEVICE

Charles R. Doty, Poughkeepsie, N. Y., assignor to International Business Machines Corporation, New York, N. Y., a corporation of New York Application November 21, 1950, Serial No. 196,860

2 Claims. (Cl. 271—54)

This invention relates to record-controlled machines for perforating record cards of the well known IBM type, and more particularly it relates to card feeding devices for such machines.

The standard IBM record card has 80 columns which are numbered consecutively commencing with column 1 near the left-hand edge of the card (as normally viewed) and ending with column 80 at the opposite end of the card. These columns are located accurately with respect to the 80th-column end of the card, which serves as a reference point. When such cards are being perforated in a perforating machine, it is the practice generally to feed each card with the column-1 end thereof leading. The 80th-column end of the card, which usually is the trailing end, is registered against a fixed abutment or stop on the card carriage, while the column-1 end of the card is engaged with a yieldable abutment on the carriage.

Record cards frequently are perforated under the control of a record tape or similar source record. The tape may be prepared in any of several ways, for example, by means of a tape perforating attachment on a typewriting machine. The data characters are recorded consecutively in the tape, and if an error should occur, an appropriate error cancellation symbol is recorded in the tape.

Recently there have been proposed several systems in which the reading of the tape and the perforation of the card under control thereof are performed in reverse fashion. That is to say, the reading of the tape characters commences with the last character recorded, and the card columns are perforated beginning with the highest-numbered column and progressing through the lower-numbered columns. The advantage of such a system is that if an error is made in course of preparing the tape, an error symbol may be recorded at the end of the erroneous field, and when the tape is subsequently read in reverse, the error symbol is detected ahead of the erroneously recorded data. This is effective to suppress the punching of a card under the control of that particular field in the tape. The suppression of errors in this manner is more convenient than the conventional methods for accomplishing the same result.

Conventional card carriages are not well adapted for the reverse feeding of record cards. If the position of the card on the carriage is reversed so that the 80th-column end of the card is leading instead of trailing, there is a possibility that the data perforations will not be located accurately with respect to the card columns. This is because of the fact that in conventional record cards, the distance between any given card column and the column-1 edge of a card may vary slightly due to variations in the card length, and if the position of the card were to be reversed on a conventional carriage, the column-1 edge would be brought against the stop which normally fixes the position of the 80th-column or reference edge of the card. On the other hand, it would not be economically feasible to reverse the direction of card travel while maintaining the card in its customary position on the carriage, because this would involve modification of the existing carriage drive mechanisms.

An object of the present invention is to provide an improved, economical card feeding device in a card perforating machine for feeding a record card in a reversed position (80th-column end leading), but in the conventional direction, while maintaining the card columns accurately registered with respect to the punches.

Another object is to provide an improved card carriage having provisions to maintain the leading edge of the card registered with a fixed point on the carriage.

The invention features a novel card pusher at the trailing end of the carriage, this pusher being resiliently urged against the trailing edge of the card to maintain the leading edge thereof in contact with a front card stop or abutment on the carriage. When the carriage is returned after feeding a card through the machine, this pusher is automatically retracted in a novel manner to afford clearance for the trailing edge of a new card as the same is introduced to the carriage.

Other objects of the invention will be pointed out in the following description and claims and illustrated in the accompanying drawings, which disclose, by way of an example, the principle of the invention and the best mode, which has been contemplated, of applying that principle.

Figures 1, 3:
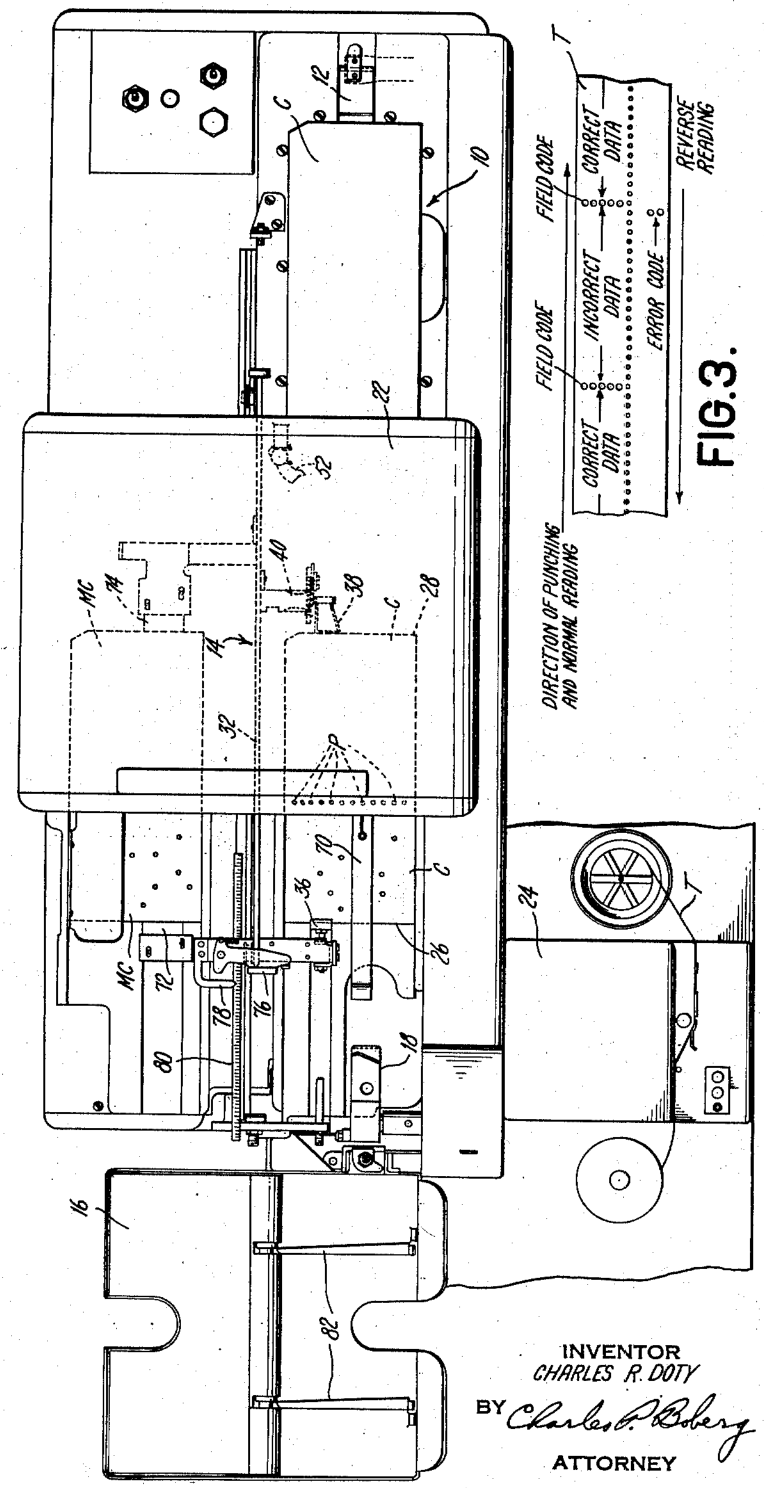
Fig. 1 is a plan view of a typical record-controlled card perforating machine embodying the invention.
Fig. 3 is a partially schematic view of a record tape used to control the punching of record cards in the machine of Fig. 1.
Figures 4, 5, 6:
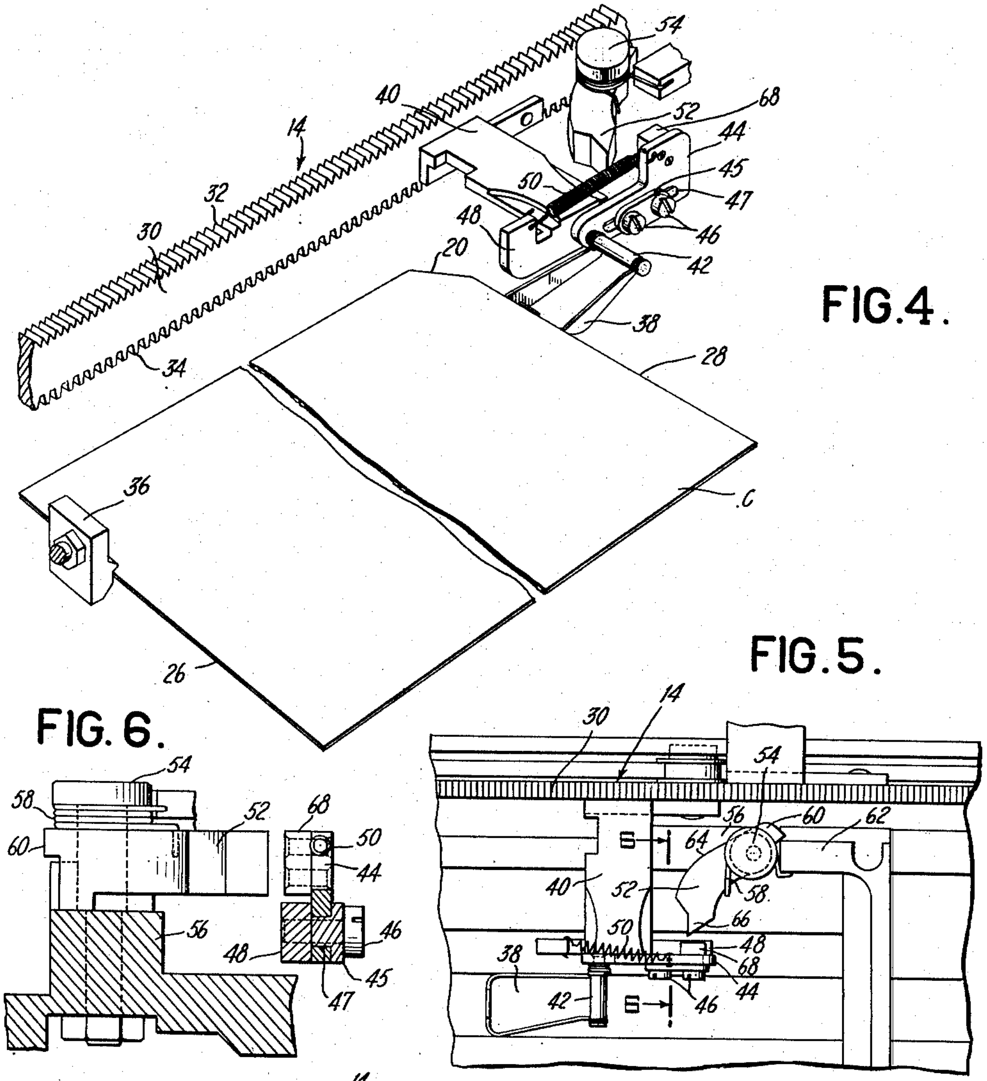
Fig. 4 is a partial perspective view showing the card carriage, in the act of feeding a record card through the machine, and an associated portion of the mechanism included in the illustrated embodiment of the invention.
Fig. 5 is a plan view showing the principal portion of the apparatus illustrated in Fig. 4, with the card carriage in the act of being returned.
Fig. 6 is a cross section on the line 6—6 in Fig. 5.

The machine illustrated in Fig. 1 is adapted to perforate record cards C of the well-known IBM type (Fig. 2) under the control of a record tape T (Figs. 1 and 3) or, alternatively, under the control of a master card MC (Fig. 1). The blank record cards are fed successively from a card magazine 10 by a reciprocating picker 12 to the card carriage generally designated 14 (Figs. 1 and 4). The carriage 14 is shown occupying an intermediate position in Fig. 1. When the card C commences its travel through the machine, after being fed out from the magazine 10, the carriage 14 occupies an extreme right-hand position near the magazine 10. The carriage 14 then moves the card C to the left, as viewed in Fig. 1, in step-by-step fashion toward a stacker box 16, to which each card is ejected by the ejector jaws 18 when it completes its travel through the machine.

Figure 2:
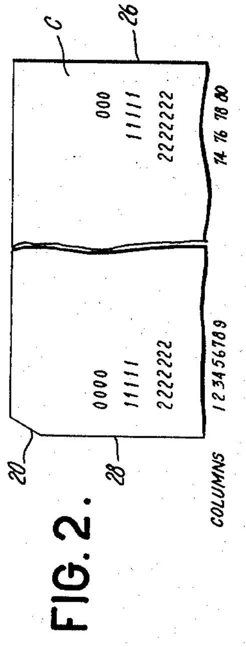
Fig. 2 is a fragmentary plan view of a record card.

Referring to Fig. 2, each record card C has a plurality of transverse columns each containing a series of index points in which perforations may be formed to represent data according to the familiar statistical code. In the standard record card there are 80 columns, each bearing ten index points numbered zero and 1 to 9, inclusive, for numeric data. An additional two index points at the top of each column may be utilized also for the representation of alphabetic data on the card. One corner of the card is cut diagonally, as indicated at 20 in Fig. 2, for the well-known purpose of orienting the card C properly in the magazine 10 (Fig. 1).

As the card carriage 14 moves step-by-step through the machine, it presents the columns of each record card C successively to a row of punches P, the positions of which are indicated in Fig. 1, that are included in a punch unit (not shown) located beneath the cover or housing 22. Each punch P is aligned with one of the index points on the record card. The punches P are operated selectively to perforate holes in the card C for representing data in accordance with a statistical code. Through the medium of control circuits familiar to those skilled in the art, the punches P may be operated under the control of the record tape T (Figs. 1 and 3) which is passed through a tape reader 24, and they may be operated also under the control of a master card MC (Fig. 1) which is fed through the machine concurrently with each record card C. Certain information which is common to all of the record cards C is derived from the master card MC, while variable data that are individual to the record cards are derived from the tape T.

Referring to Fig. 3, the characters which constitute the data generally are recorded in the tape T from left to right. Normally the tape would be read from left to right, but in the present instance the tape T is read in the reverse direction, as indicated by the lower arrow. It is customary to prepare the tape record in a tape perforating machine which perforates data-representing holes in the tape according to some combinational code. In the course of perforating a particular field of the tape, the operator may discover that she has made an error. Under these circumstances, the operator inserts an error code, as indicated in Fig. 3, at the time the error is made or discovered, and she then starts to perforate a new field of the tape adjoining thereto in accordance with the correct data. When the tape T is read in reverse, the correct data are detected first. Following this, the error code at the end of the incorrect field is detected. This gives a signal to the machine that has the effect of suspending the card punching operation until the incorrect field has been traversed by the tape reader 24 (Fig. 1). The beginning of each field is denoted by a field code punching, as indicated in Fig. 3. Card punching is resumed with the reading of the first succeeding field that does not have an error code therein.

Normally the blank record cards would be fed through a perforating machine face up, as indicated in Fig. 2. The card columns are located accurately at graduated distances from the 80th-column edge 26 of the card C. Customarily this edge 26 is registered against a fixed abutment or stop on the carriage which, in the conventional machine, would be located at the rear or trailing end of the carriage. This stop or abutment in the conventional machine may serve also as a pusher for the card. In the present machine, however, where the record tape is being read in reverse, the record cards C must be punched in reverse, that is, starting with column 80. Thus, referring to Fig. 4, each card C is fed face down, with the 80th-column edge 26 in the lead. The conventional card carriage registers the trailing edge of the card against a stop, since this edge normally is the one nearest the 80th column, but in the present instance the trailing edge 28 of the card C is adjacent to column 1 of the card (Fig. 2). Due to minute variations in card lengths, the distance of any given card column from the edge 28 may vary slightly, whereas its distance from the edge 26 does not vary from one card to another. The conventional card carriage, which always registers the trailing edge rather than the leading edge of the card, might be found unsuitable for use in the present instance where the "column 1" edge 28 is at the trailing end of the card.

The card carriage 14 (Fig. 4) includes a rack 30 having a serrated upper edge 32 that cooperates with a well-known escapement mechanism (not shown). The lower edge of the rack 30 has teeth 34 formed therein for cooperation with a gear (not shown) which is part of the drive mechanism for the carriage. The details of the escapement mechanism and drive mechanism are familiar to those skilled in the art and are not described herein, being merely incidental to the present invention. During the normal card feeding movement of the carriage 14 (from right to left as viewed in Fig. 1) the rack 30 is escaped one column step at a time, except during those intervals when card columns are being skipped. When the carriage 14 completes its card feeding movement, it is restored by the drive mechanism (from left to right as viewed in Fig. 1) to an initial position for receiving a new card fed from the magazine 10.

The leading or "80th-column" edge 26 of the card C is registered against an adustable fixed stop 36 (Figs. 4 and 1). The position of the stop 36 is carefully adjusted so that when the carriage 14 assumes its initial feeding position, column 80 of the card C is positioned directly beneath the punches P (Fig. 1). With each forward step of the carriage 14, a succeeding card column is brought into accurate alignment with these punches.

The trailing or "column 1" edge 28 of the card C is, in the present instance, engaged by a pusher or yieldable abutment 38 (Figs. 4 and 5) supported by an arm 40 extending from the rack 30. The pusher 38 is pivotally mounted on a pin 42 anchored in a slide 44. The slide 44 is mounted on screws 46 (Figs. 4 and 6) which pass through a bushing 45 disposed within the horizontal slot 47 in the slide 44, and these screws 46 are secured in a flange 48 on the end of the arm 40. The slide 44 is resiliently urged toward the card C by a coil spring 50 which is anchored at opposite ends thereof to upstanding lugs on the slide 44 and the flange 48.

When a new card is being introduced in the carriage 14 from the magazine 10, the card slides along the card bed of the machine beneath the pusher 38 which tilts upwardly as the card is passing beneath it. The leading edge 26 of the card C (Fig. 4) is arrested by the stop 36, and the pusher 38 thereupon drops behind the trailing edge 28 of the card C.

Figure 7:
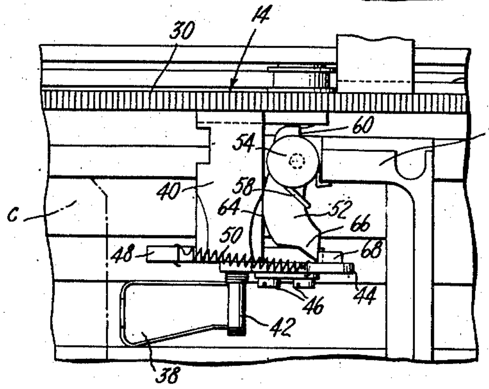
Fig. 7 is a partial plan view similar to Fig. 5, but with the card carriage fully restored.

Inasmuch as the spring 50 constantly tends to move the pusher 38 forwardly, some provision must be made to retract the slide 44 to afford clearance between the trailing card edge 28 and the pusher 38 when the card C is being placed in the carriage 14. For this purpose there is provided a small lever 52 (Figs. 1, 4 and 5) which is mounted on a pivot 54 secured to a projecting portion 56 (Fig. 6) of the card bed. A spring 58 coiled around the pivot 54 tends to urge the lever 52 clockwise, as viewed in Fig. 5, such movement of the lever 52 being limited by engagement of a tail portion 60 (Fig. 5) of this lever with a portion 62 of the frame of the punch unit. The lever 52 is so disposed that it will be engaged by the arm 40 of the carriage 14, as shown in Fig. 7, when the carriage 14 nears the end of its return movement, following the ejection of a punched card from the carriage.

As the carriage 14 completes its return movement, the arm 40 bears against a rounded intermediate portion 64 (Fig. 7) of the lever 52. Simultaneously with this action, the nose 66 of the lever 52 is brought against a small block 68 (Figs. 6 and 7) secured to the rear face of the slide 44. There is a momentary overthrow of the rack 30, during which time the arm 40 pushes against the rounded part 64. Due to the third-degree lever action, the nose 66 of the lever 52 travels to the right (as viewed in Fig. 7) more rapidly than does the carriage 14. Hence the nose 66 pushes against the block 68 and, as a result of this, the slide 44 is retracted to the right (Fig. 7) relative to the carriage 14. The pusher 38 is retracted along with the slide 44, so that the distance between the card-engaging part of the pusher 38 and the front card stop 36 (Figs. 1 and 4) is slightly greater than the length of a record card C. Hence, when a new card is fed from the magazine 10 to the carriage 14, there will be sufficient clearance between the pusher 38 and the trailing edge of the card so that the pusher 38 will drop behind the trailing edge 28 (Fig. 4) as the leading edge 26 of the card C reaches the stop 36. Then, when the carriage 14 drops back to its normal starting position a slight distance to the left of the overthrow position thereof illustrated in Fig. 7, the lever 52 is released, assuming the position thereof shown in Fig. 5 as the arm 40 moves away from this lever. The slide 44 thereupon is released to the action of its spring 50, and the spring 50 thereupon pulls the slide 44 until the pusher 38 engages the trailing edge 28 of the card C as shown in Fig. 4. The carriage 14 then is in condition to advance the card C through the punch unit.

To eliminate any possibility of the card buckling as it is being fed through the machine, there is provided a leaf spring 70 (Fig. 1) anchored to the frame of the punch unit, which extends along the card bed and presses the card C against this bed, maintaining the card flat at all times while it is in the process of being punched.

The master card MC is positioned between abutments 72 and 74 (Fig. 1) supported by the carriage 14, in the usual fashion. The carriage also includes various other well-known devices such as a column cutout lever 76, and a pointer 78 cooperating with a column-indicating scale 80.

The mechanism which operates the ejector jaws 18 is familiar to those skilled in the art. As each card is ejected by the jaws 18, it is turned face up. If it is desired that the cards be again turned face down, a reversing stacker device 82 is employed.

The novel card carriage 14 disclosed herein, with its fixed front stop 36 and longitudinally movable, resiliently urged pusher 38, is designed for use with standard tape-controlled card perforating machines to feed record cards in reversed position while maintaining the card columns accurately aligned with the punches. Each card is firmly held under spring tension at its trailing end to insure that the leading edge of the card is maintained against the precision-adjusted stop 36. When the carriage 14 is returned, the pusher 38 is positively retracted against the force of its spring 50 and then released to bring the pusher 38 solidly behind each new card which is introduced to the carriage. These functions are accomplished with simple, inexpensive means, thereby enabling one to obtain the advantages of reverse tape reading and reverse card feeding without substantially increasing the cost of standard tape-controlled card perforating machines.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for perforating data designations in the columns of a record card, the combination of a card carriage adapted to move the card in a forward direction along a given path through the machine and being adapted to return thereafter in the reverse direction along said path to a predetermined position for receiving a new card, said carriage including a stop for registering the leading edge of a card which is being moved by said carriage in said forward direction, and also including a pusher cooperable with the trailing edge of the card for moving said card in said forward direction, said pusher being movable longitudinally of said path relative to said stop, resilient means on said carriage normally effective to urge said pusher into a position for engaging said trailing card edge to maintain said leading card edge against said stop, said pusher and said stop being combined with said carriage as an integrated structure for maintaining the leading edge of the card registered with said stop throughout substantially the entire forward travel of said carriage, and positive retracting means actuated by said carriage in its return movement for moving said pusher to increase the distance between said pusher and said stop when said carriage attains said predetermined position thereof, thereby affording clearance between said pusher and the trailing edge of the new card received by said carriage.

2. In a machine for perforating data designations in the columns of a record card, the combination of a card carriage adapted to move the card in one direction along a given path through the machine and being adapted to return thereafter in the opposite direction along said path to a predetermined position for receiving a new card, a stop on said carriage for registering the leading edge of a card which is being moved by said carriage in said one direction, a pusher on said carriage cooperable with the trailing edge of the card for moving said card in said one direction, slide means on said carriage supporting said pusher for movement longitudinally of said path, resilient means on said carriage normally acting upon said slide to urge said pusher into a position for engaging said trailing card edge to maintain said leading card edge against said stop, and retracting means responsive to the return movement of said carriage for moving said pusher to increase the distance between said pusher and said stop when said carriage attains said predetermined position thereof, thereby affording clearance between said pusher and the trailing edge of the new card received by said carriage, said retracting means including a lever stationarily pivoted on said machine and having an end portion cooperable with said slide and having an intermediate portion adapted to be engaged by a portion of said carriage.

References Cited in the file of this patent

UNITED STATES PATENTS

| Number | Name | Date |
|---|---|---|
| 1,888,659 | Eckhard | Nov. 22, 1932 |
| 2,074,720 | Eckhard | Mar. 23, 1937 |
| 2,566,951 | Mills | Sept. 4, 1951 |